United States Patent

[11] 3,602,327

[72] Inventor Bela Barenyi
 Stuttgart-Vaihingen, Germany
[21] Appl. No. 749,010
[22] Filed July 31, 1968
[45] Patented Aug. 31, 1971
[73] Assignee Daimler-Benz Aktiengesellschaft
 Stuttgart-Unterturkheim, Germany
[32] Priority Aug. 2, 1967
[33] Germany
[31] P 16 30 328.9

[54] INSTRUMENT PANEL FOR MOTOR VEHICLES, ESPECIALLY PASSENGER MOTOR VEHICLES
18 Claims, 6 Drawing Figs.
[52] U.S. Cl. ................................................. 180/90,
 280/150 B
[51] Int. Cl. ....................................................... B60k 37/00
[50] Field of Search ........................................... 280/150;
 296/70; 180/90

[56] References Cited
UNITED STATES PATENTS
2,375,567  5/1945  Luton ........................... 180/90
2,571,627  10/1951 Sloman et al. ................. 180/90
2,855,066  10/1958 Nallinger ....................... 180/90
3,088,539  5/1963  Mathues et al. ............... 180/90
3,130,807  4/1964  McHenry ...................... 180/90
3,451,500  6/1969  Porsche et al. ................ 180/90

FOREIGN PATENTS
999,219  7/1965  Great Britain ................. 180/90
1,431,428  1/1966  France .......................... 180/90

Primary Examiner—Kenneth H. Betts
Attorney—Craig, Antonelli, Stewart & Hill

ABSTRACT: An instrument panel for motor vehicles, especially passenger motor vehicles which comprises a covering of suitable padding material such as foamed material or the like; the covering itself is arranged on a sheet-metal base member of the framework, includes a substantially cylindrically shaped base body made from such padding material at least within the area of the passenger seated next to the driver and is mounted with its base body on a preferably flat surface of the sheet-metal baseplate.

PATENTED AUG 31 1971 3,602,327

INVENTOR
BELA BARENYI

BY Craig & Antonelli
ATTORNEYS

INVENTOR
BELA BARENYI

ATTORNEYS

INSTRUMENT PANEL FOR MOTOR VEHICLES, ESPECIALLY PASSENGER MOTOR VEHICLES

The present invention relates to an instrument panel for motor vehicles, and more particularly to an instrument panel covering for motor vehicles, especially passenger motor vehicles, which consists of padding material such as foamed material or the like and is arranged on the preferably flat sheet-metal baseplate of the frame structure.

The known instrument coverings and facings of the prior art entail disadvantages from the points of view of manufacture, assembly, price, and in particular safety by reason of the completely inorganic separating places disposed in several mutually rotated planes and displaced or moved excessively forwardly into the passenger space. Additionally, with the known instrument panels, the spatial conditions for the accommodation of all apparatus, indicating devices and operating devices, especially of the glove compartment are unfavorable by reason of the very deep arrangement thereof. Above all, the glove compartment always turned out too small heretofore.

The present invention aims at avoiding these disadvantages. It essentially consists in that the instrument panel covering consists of a base body constructed substantially cylindrically shaped at least within the area of the passenger seated next to the driver, which base body is mounted on the flat surface of the sheet-metal baseplate of the framework. It is made possible thereby to displace the separating plane far back, and a considerable advantage results especially from a safety point of view by the large and angularly favorably positioned impact surfaces which are displaced or moved further forwardly thereby.

The base body may consist in an extraordinarily favorable manner of an energy-absorbing foamed material. Such types of foamed material, which are known per se in the art, enable large deformation paths under dissipation of considerable energies. An elastic return into the initial shape takes place nonetheless, even though admittedly with considerable time-delay.

In order to utilize the space saving realized by the substantially roller-shaped or cylindrically shaped base body, the latter may be provided on the side facing the passenger space with one or several recesses or apertures which are surrounded by the remaining rims in a bulgelike or beadlike manner. The instruments and indicating apparatus may be accommodated in these apertures, for example, on the driver side whereas objects may be stored in the recesses on the passenger side next to the driver. Provision may thereby be made appropriately that the indicating apparatus arranged on the sheet-metal baseplate are covered by means of window panes disposed in the apertures or recesses and preferably clampingly held to the base body.

The safety of the driver and of the passengers can be further increased if deformation members of sheet-metal steel or aluminum are arranged within the base body. A shell-shaped deformation sheet-metal plate may be provided thereby as deformation member whose edges extend up to within proximity of the surface of the base body. It is also possible to provide closely below the surface of the base body a sheet-metal ring extending parallel thereto.

According to a further development and feature of the present invention, for the purpose of creating a glove compartment within such an instrument panel covering, taking safety requirements into due consideration, the cylindrically shaped base body has a horizontally extending separating joint and covers a sheet-metal box provided with a cover and arranged on the sheet-metal baseplate. Provision may thereby be made in an extraordinarily advantageous manner that the cover of the sheet-metal box has a curved or arched shape and is arranged so as to pivot upwardly.

Accordingly, it is an object of the present invention to provide an instrument panel covering for motor vehicles, especially passenger motor vehicles, which eliminates the aforementioned shortcomings encountered in the prior art.

Another object of the present invention resides in an instrument panel covering for passenger motor vehicles which is favorable from a manufacturing, assembly and price point of view.

A still further object of the present invention resides in an instrument panel of the type described above which offers extraordinarily great safety by simple means.

Still another object of the present invention resides in an instrument panel for motor vehicles which permits a sufficiently large glove compartment.

A further object of the present invention resides in an instrument panel covering for motor vehicles, especially passenger motor vehicles which achieves all of the aforementioned aims and objects in a simple manner without impairing the proper accommodation of all instruments and actuating as well as operating devices.

These and further objects, features, and advantages of the present invention will become more obvious from the following description when taken in connection with the accompanying drawing which shows, for purposes of illustration only, several embodiments in accordance with the present invention, and wherein.

Figure 1:
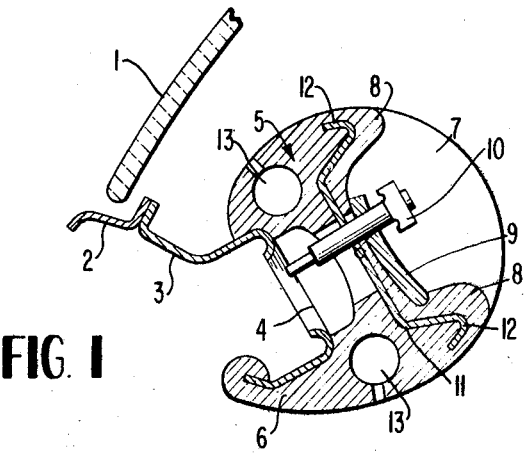
FIG. 1 is a cross-sectional view through an instrument panel covering in accordance with the present invention.
Figure 2:
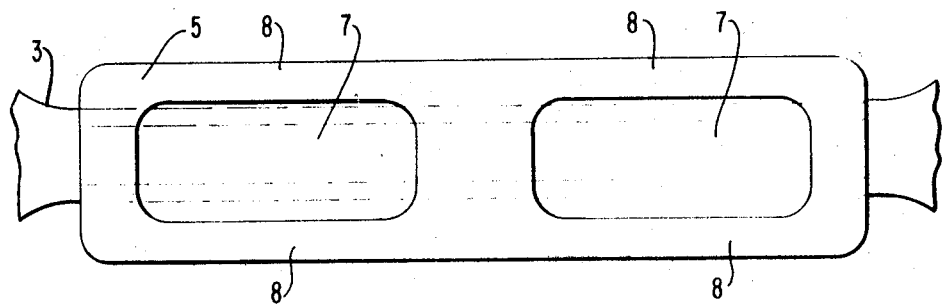
FIG. 2 is a view on the instrument panel covering of FIG. 1 as approximately seen from the driver's position.

Referring now to the drawing wherein like reference numerals are used throughout the various views to designate corresponding parts, and more particularly to FIGS. 1 and 2, the sheet-metal base member 3 of the framework adjoins the sheet-metal member 2 forming the frame for the windshield 1. A roller- or cylindrically shaped base body generally designated by reference numeral 5 and made of padding material such as foamed material or the like, which may be made advantageously of a conventional energy-absorbing, foamed material, is placed over an essentially flat surface 4 of this sheet-metal baseplate 3. The cylindrically shaped base body 5 form lockingly surrounds with a portion 6 thereof constructed as knee protection the downwardly bent lower end of the sheet-metal base member 3. In order not to have to maintain small tolerances during the manufacture and assembly, provision is made that the base body 5 does not extend in the transverse direction over the entire width of the sheet-metal base member 3.

On the side facing the passenger space, the cylindrically shaped base body 5 is provided with recesses or apertures 7 which are surrounded in a bulgelike manner by the remaining rim portions 8. The indicating apparatus and operating devices are located within the area of the apertures or recesses 7 of the base body 5. The indicating apparatus may be covered by panes 9 which are either adhesively secured, e.g., are bonded, glued, or cemented to the bottom of the aperture or recess 7 or which are preferably secured thereat clampingly. For example, the actuating lever 10 illustrated in FIG. 1, is arranged so far recessed below the rims 8 surrounding the same in a bulgelike manner that it does not represent any danger of injury in case of impact of a vehicle passenger.

In order to dissipate the energy existing during an impact of a vehicle passenger, a shell-shaped deformation sheet-metal member 11 made from aluminum or steel sheet metal is arranged within the base body 5. The rims 12 of this shell-like sheet-metal plate 11 extend directly up to below the surface of the base body 5. Apertures 13 are additionally provided within the roller-shaped base body 5 which extend in the longitudinal direction and serve to hold the cylindrically shaped base body 5 during its manufacture and to enable transportation thereof, and which additionally represent a material saving of the base material that is normally quite expensive.

Figure 3:
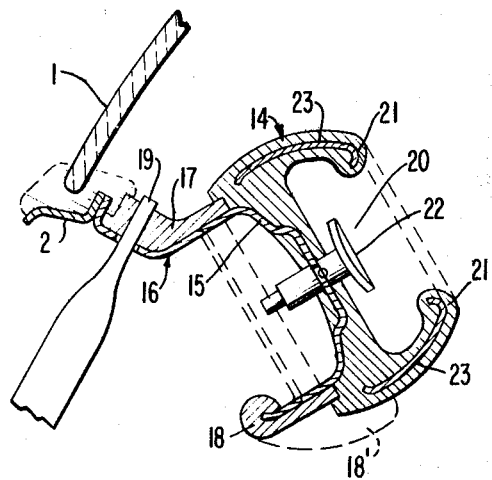
FIG. 3 is a cross-sectional view through a modified embodiment of an instrument panel covering in accordance with the present invention.
Figure 4:
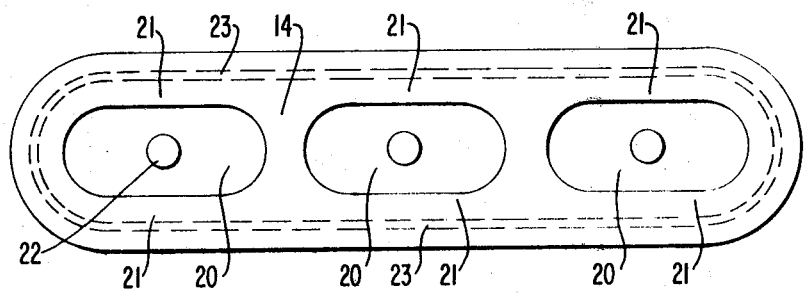
FIG. 4 is a view on the instrument panel covering of FIG. 3, as seen approximately from the position of the driver.

A base body generally designated by reference numeral 14 and constructed in a similar manner as in the embodiment of FIG. 1, is illustrated in FIG. 3; however, the base body 14 of FIG. 3 is constructed completely symmetrically. The roller- or cylindrically shaped base body 14 is also mounted on an essentially flat surface 15 of the sheet-metal base member 16 and presses against additional covering portions 17 and 18 which cover within the upper area the ventilating installations 19 for the windshield 1 and may form in the lower part of the sheet metal base member 16 a knee protection 18'. Apertures or recesses 20 are also provided in this cylindrically shaped base body 14 in such a manner that the remaining rims 21 surround the apertures or recesses 20 in a bulgelike manner. The danger of injury by the actuating knob 22 arranged within the aperture or recess 20 is prevented in this manner. A sheet-metal ring 23 extending essentially parallelly to the surface of the base body 14 is provided within the base body 14 as deformation element.

Figure 5:
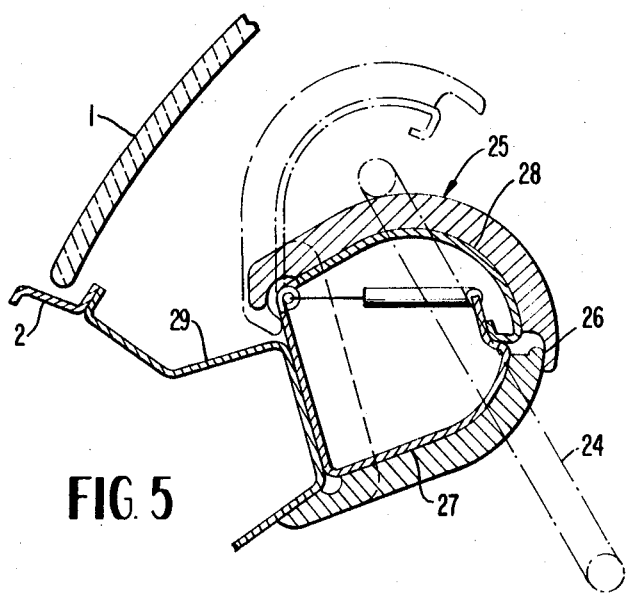
FIG. 5 is a cross-sectional view of a still further, modified embodiment of an instrument panel covering in accordance with the present invention, taken along line V—V of FIG. 6.
Figure 6:
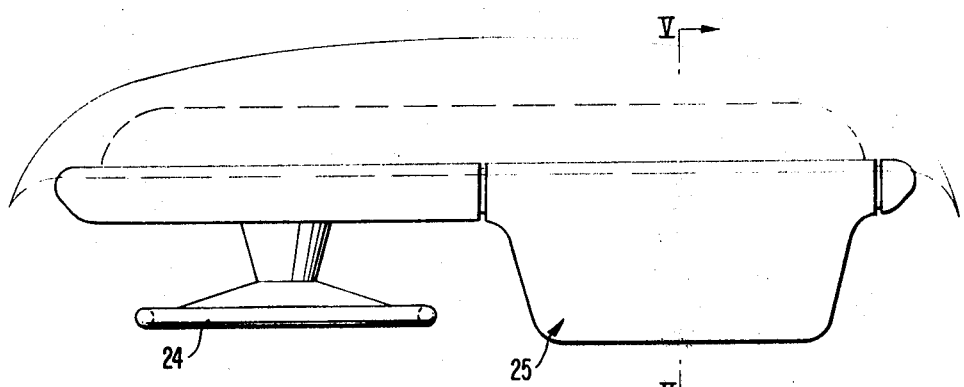
FIG. 6 is a plan view on the instrument panel covering of FIG. 5.

It suffices, as shown in FIGS. 5 and 6, to construct the instrument-panel covering in the form of a roller or cylinder only within the area of the passenger seated alongside the driver because within the area of the driver, the instrument-panel covering is disposed behind the steering wheel 24. The roller- or cylindrically shaped base body generally designed by reference numeral 25, illustrated in this embodiment includes a horizontal separating joint 26 and is arranged partly on the housing 27 and partly on the cover 28 of a sheet-metal box. The sheet-metal box 27, 28 which adjoins directly an essentially flat surface of the sheet-metal base member 29 and simultaneously forms a deformation member, represents an extraordinarily advantageous and in particular safe construction of a glove compartment. The cover 28 adapted to pivot upwardly has a curved or arcuate shape so that also in this case no dangerous, sharp edges project into the passenger space in case of a collision or accident of the vehicle which might lead to injuries of the passengers.

While I have shown and described only three embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. An instrument panel covering for motor vehicles, especially passenger motor vehicles, which consists of a padding material and is arranged on a substantially planar sheet-metal base member of an instrument-panel support member projecting into the passenger space, characterized in that the instrument-panel covering consists of an approximately cylindrically shaped base body means with deformation means arranged in the interior thereof, which base body means is mounted on the planar sheet-metal base member of the support member and is provided with edges extending around the instrument panel support member in a bulgelike manner.

2. An instrument-panel covering according to claim 1, wherein said padding material is a foamed material.

3. An instrument-panel covering according to claim 1, wherein the base body means consists of energy-absorbing foamed material.

4. An instrument-panel covering according to claim 3, wherein the base body means is provided with at least one aperture means on the side thereof facing the passenger space which is surrounded by the remaining rim portions in a bulgelike manner.

5. An instrument-panel covering according to claim 4, wherein several such aperture means are provided.

6. An instrument-panel covering according to claim 4, further comprising indicating means mounted on the support member and covered by pane means disposed in said aperture means.

7. An instrument-panel covering according to claim 6, wherein said pane means are clampingly retained in said aperture means.

8. An instrument-panel covering according to claim 6, wherein said deformation means is made from sheet-metal material selected from the group essentially consisting of steel, aluminum and alloys thereof.

9. An instrument-panel covering according to claim 6, wherein a shell-shaped, sheet-metal deformation member is provided as deformation means whose edges extend close up to the surface of the base body means.

10. An instrument-panel covering according to claim 6, wherein an annular member is provided closely underneath the surface of the base body means which extends substantially parallelly thereto.

11. An instrument-panel covering according to claim 10, wherein said annular member is made from a sheet-metal material selected from the group consisting of steel, aluminum and alloys thereof.

12. An instrument-panel covering according to claim 1, wherein the base body means is provided with at least one aperture means on the side thereof facing the passenger space which is surrounded by the remaining rim portions in a bulgelike manner.

13. An instrument-panel covering according to claim 12, further comprising indicating means mounted on the support member and covered by panel means disposed in said aperture means.

14. An instrument-panel covering according to claim 12, wherein several such aperture means are provided.

15. An instrument-panel covering according to claim 1, wherein said deformation means is made from sheet-metal material selected from the group essentially consisting of steel, aluminum and alloys thereof.

16. An instrument-panel covering according to claim 1, wherein a shell-shaped, sheet-metal deformation member is provided as deformation means whose edges extend close up to the surface of the base body means.

17. An instrument-panel covering according to claim 1, wherein an annular member is provided closely underneath the surface of the base body means which extends substantially parallelly thereto.

18. An instrument-panel covering according to claim 1, wherein the base body means is provided with at least one aperture means on the side thereof facing the passenger space which is surrounded by the remaining rim portions in a bulgelike manner.